Sept. 15, 1953 C. E. WILKEN ET AL 2,651,837
APPARATUS FOR FORMING BLOWER WHEELS
Original Filed July 17, 1947 2 Sheets-Sheet 1
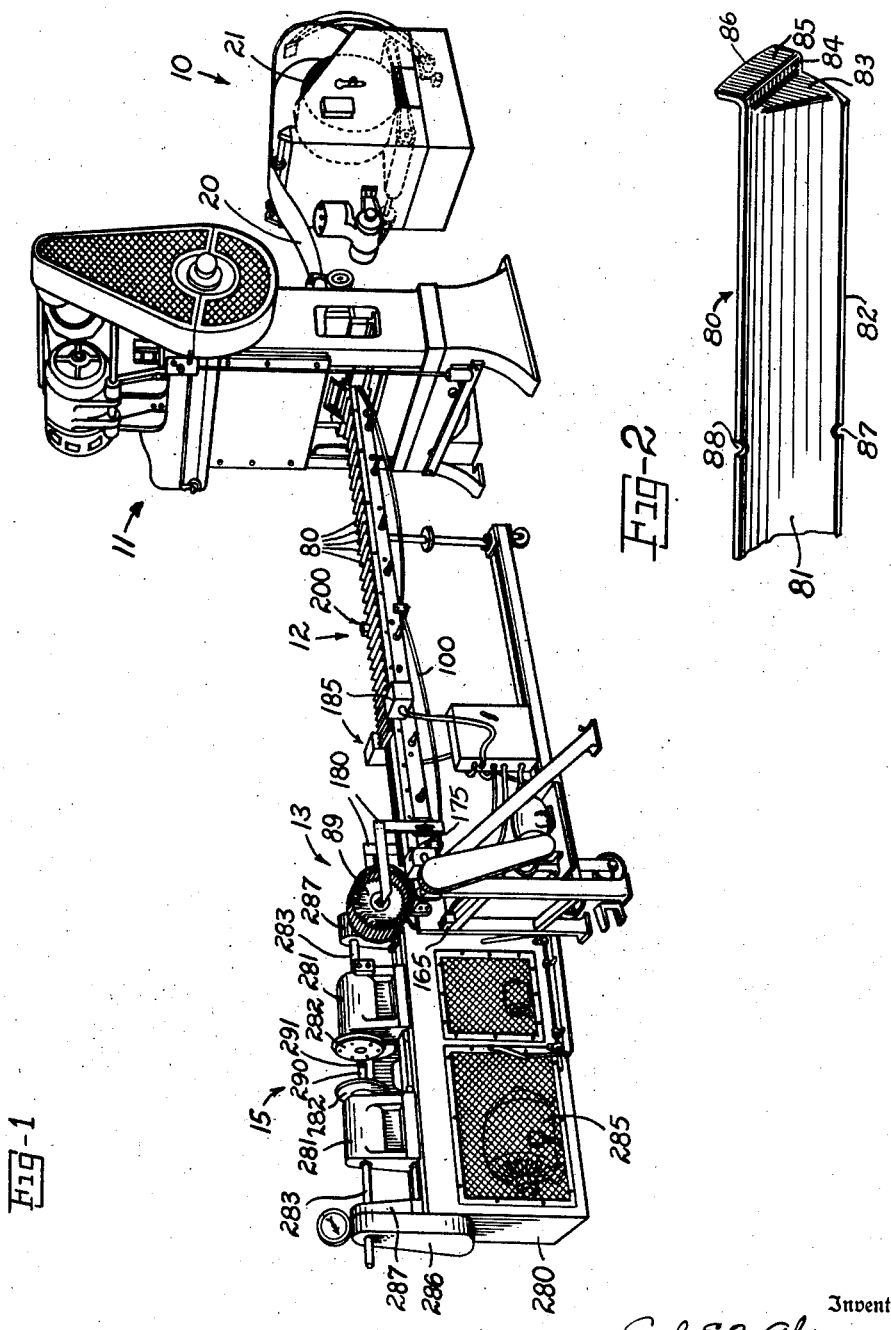
Inventors
Carl E. Wilken and
Lyle L. McGladrey
Marechal to Biebel
attorneys

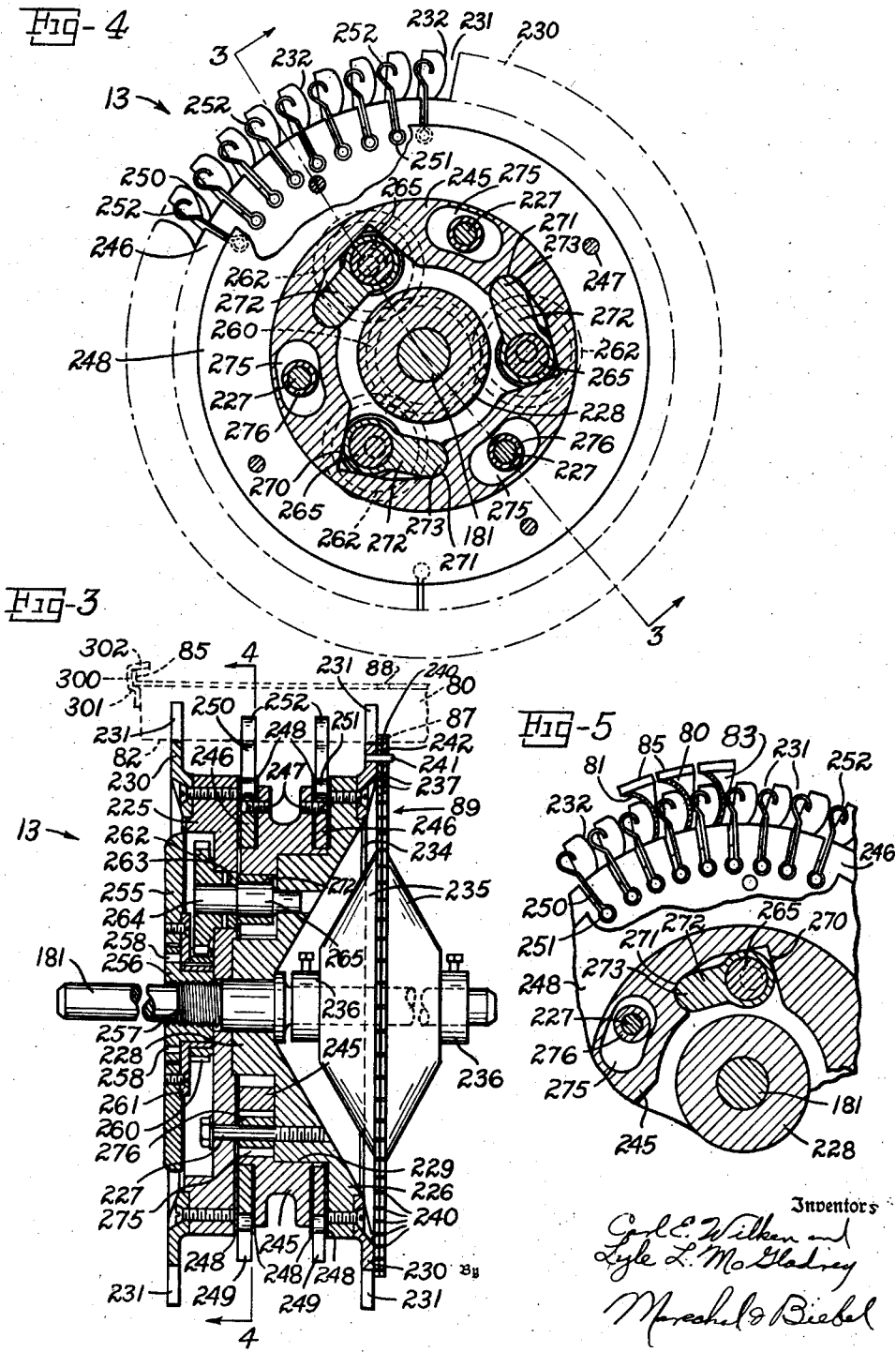

Patented Sept. 15, 1953

2,651,837

UNITED STATES PATENT OFFICE 2,651,837

APPARATUS FOR FORMING BLOWER WHEELS

Carl E. Wilken, Dayton, Ohio, and Lyle L. McGladrey, Cloquet, Minn., assignors to The Lau Blower Company, Dayton, Ohio, a corporation of Ohio Original application July 17, 1947, Serial No. 761,476. Divided and this application June 21, 1948, Serial No. 34,334

6 Claims. (Cl. 29—286)

This invention relates to multiple blade centrifugal fans of the type commonly known as blowers, and more particularly to a method and apparatus for the fabrication of rotors or blower wheels for such blowers.

One of the principal objects of the invention is to provide apparatus for fabricating blower wheels by means of which the individual blower blades are successively formed, conveyed to an assembling station, and assembled and held in proper circumferential alignment about a central axis as a substantially continuous and rapid operation requiring minimum attention on the part of the operator.

An additional object is to provide apparatus for forming and conveying individual blower blades to an assembling station in spaced and guided relation such that the blades may be readily picked up in an assembling and holding fixture by simple rotation of the fixture relative to the moving blades without the necessity of individual handling of the blades.

It is also an object of the invention to provide an assembling and holding fixture for use in the fabrication of blower wheels which is adapted to be mounted for rotation relative to a track for conveying individual blower blades to an assembling station and which is effective when rotated to pick up and hold the blades in proper circumferential alignment for the subsequent application of end rings thereto to complete the blower wheel.

Other objects and advantages of the invention will be apparent from the following description, the accompanying drawings and the appended claims.

This application is a division of application Serial No. 761,476, filed July 17, 1947.

In the drawings, in which like characters of reference designate like parts throughout—

Fig. 1 is a view in perspective illustrating apparatus for fabricating blower wheels in accordance with the invention;

Fig. 2 is a fragmentary view in perspective of a blower blade;

Fig. 3 is a view in axial section of the blade assembling fixture of the apparatus, the view being taken substantially on the line 3—3 of Fig. 4;

Fig. 4 is a view in transverse section taken on the line 4—4 of Fig. 3, showing the fixture with its blade holding mechanism in relatively unlocked position; and Fig. 5 is a fragmentary view similar to Fig. 4 but showing the blade holding mechanism in relatively locked position.

Blower wheels of the type to which the present invention relates may be constructed from an integral sheet of material by stamping the blades from the sheet in the form of louvers, or the wheel may be assembled from a group of individual and separately formed blades which are then secured together in proper operative relation. The present invention is concerned with the latter type of construction, and particularly with the production of such blower wheels by simple, reliable and effective manufacturing operations at high speed and low unit cost. The invention provides apparatus and methods by means of which the individual blower blades for such wheels are blanked and formed from sheet stock and assembled and secured in a finished blower wheel in a substantially continuous operation requiring only general supervision and control by the operator. The assembling of the blades is carried out at substantially the same rate as the forming operation, and the apparatus of the invention is of such character as to minimize handling of the individual blades and to guide the blades automatically into proper position in an assembling and holding fixture or jig, thus providing for both rapid and accurate results.

In accordance with the invention, the individual blower blades are delivered directly from the forming part or station of the apparatus to a track which conveys them to an assembling station, and the blades and track include portions which cooperate to guide the blades in proper alignment and relative spacing for ease of assembly. At the assembling station there is mounted a fixture which is adapted for rotation relative to the moving track and thus for engagement with successive blades on the track, and this fixture includes gripping members for picking up the blades in proper circumferential alignment about a central axis and for holding the assembled blades in the desired proper positions. Thereafter, the end members for the finished wheel are applied to the ends of the assembled blades and secured in final position by means of a simple spinning operation, as described in the copending application of C. E. Wilken, Serial No. 635,454 filed December 17, 1945, and assigned to the same assignee as this application, now Patent No. 2,537,805 issued January 9, 1951.

The invention provides for a high degree of automatic control over the operation of this apparatus and method. The track is provided with releasable stops so arranged as to locate and hold the first advancing blade on the track in proper position to be picked up by the assembling and holding fixture, and additional stops are provided in adjustably correlated relation with the first stops to segregate the proper number of blades on the track for the particular wheel to be produced. These stops are interconnected in such manner that when the assembling operation begins, only the proper number of blades are conveyed to the fixture at the assembling station, and the remaining blades on the track are held back, thus both preventing interference by other blades with the assembling operation and also providing a time interval between assembling operations to permit the fixture which has been filled with blades to be removed from the track and replaced. A further stop is provided which is automatically effective to check the blade forming mechanism in the event of accumulation of blades on the track to an extent greater than desired, for example in the event of delay in exchanging fixtures or for any other reason, thus preventing the possibility of jamming of the apparatus by accumulated blades and assuring smooth all around operation.

Referring to the drawings, which illustrate a preferred embodiment of the present invention, Fig. 1 illustrates more or less diagrammatically complete apparatus for the fabrication of a blower wheel. As shown, the apparatus includes means indicated generally at 10 for providing a constant supply of sheet stock 20 from a supply roll 21 to a press 11 which in turn blanks and forms individual blower blades 80 and delivers them to one end of a track indicated generally at 12 and including conveyor belts 100. These blades are conveyed in guided and properly spaced relation to an assembling station at the opposite end of the track at which there is mounted a fixture or jig, indicated generally at 13, for picking up and assembling blades from the track, and adjacent the assembling station is provided a finishing device 15 for spinning end rings on the assembled blades held in the fixture. The track is so constructed and arranged that the blades 80 reach the assembling station in the same relative alignment and spacing which they are intended to have in the finished wheel, and the fixture 13 includes angularly spaced gripping members such that when it is rotated relative to the track and the advancing blades thereon, it picks up successive blades and arranges them in the proper circumferential alignment about its axis of rotation.

The track also includes interrelated stops 175 and 185, as described in the above parent application Serial No. 761,476, such that only the proper number of blades are conveyed to the assembling station for the particular size of wheel being produced, the remainder of the blades being held back at an intermediate station on the track. After the fixture has been filled with blades, the action of these stops is reversed to permit more blades to travel to the assembling station, and during the interval of travel of the first blade from the intermediate station to the assembling station, the filled fixture can be removed and a new fixture substituted. The filled fixture is then transferred to the finishing device where end rings are applied to the assembled blades and secured thereto by a spinning operation. During this operation, more blades are being assembled in the new fixture at the assembling station on the track, and this process can thus be carried on substantially continuously. The assembling fixture is of such construction that after end rings have been applied to the blades, it can be readily disengaged and withdrawn from the finished wheel and utilized again for assembling additional blades to form another wheel.

It is believed that the operation of the invention will be most readily understood in connection with a specific illustrative form of individual blower blade. Referring to Fig. 2, a typical blade 80 is shown as having a curved working face 81 which is arcuately shaped in a uniform manner over the major portion of the length of the blade, the edge 82 of this blade being adapted to lie innermost in the finished blower wheel. At either end, the wall of the blade is turned over at approximately right angles forming a laterally extending wall or flange 83 on the convex side of the blade. Beyond the wall 83 the material of the blade is bent outwardly at right angles to the longitudinally extending blade surface to form a flange 84 extending outwardly in the direction of the length of the blade. This flange 84 is in turn bent over to provide a further flange 85 which is generally parallel to the adjacent wall or flange portion 83 and may have its outer periphery 86 either flat or arcuate as shown, about a radius corresponding to the radius of the finished blower wheel. The blade edge 82 is preferably notched at its central portion as indicated at 87 in Fig. 2 for cooperation with a central disk 89 as shown in Fig. 3 and described in connection therewith. With the blades all die stamped and formed from a single continuous sheet of stock, a corresponding notch is formed on the opposite edge of the blades as shown at 88 in Fig. 2 but this latter notch is of no particular value so far as the operation of the device is concerned.

The fixture 13 for assembling and holding the blower blades is illustrated in detail in Figs. 3 to 5. Referring to Fig. 3, this fixture includes a pair of circular body members 225 and 226 which are secured together as by means of bolts 227 and include coaxial central bores for receiving a mounting spindle 181. The body member 226 also includes on its inner side a cylindrical portion 228 of relatively small diameter which abuts the adjacent surface of body member 225, leaving a hub portion 229 of members 226 intermediate the axially outer ends of the fixture.

Each of the body members 225 and 226 has bolted or otherwise secured thereto one of a pair of circular disks 230 as shown in Fig. 3. Each of these disks 230 is formed with a plurality of angularly spaced slots in its periphery, these slots being arranged generally radially of the disk and being adapted to receive the edges 82 of the blades 80. As shown particularly in Figs. 4 and 5, one edge 232 of each slot 231 is arcuately curved about substantially the same radius as the working face 81 of each blade 80, thus providing for engagement between this edge 232 and the working face of a blade positioned in the slot 231. It will be understood that the disks 230 are so arranged that the slots 231 in each thereof are substantially directly in line with each other.

The body member 226 is formed on its axially outer side with a frusto-conical cutout portion 234 to receive a similarly shaped hub portion 235 of a center disk 89, which may be mounted on spindle 181 as shown in Fig. 3, the cutout portion 234 being of sufficient depth to receive the locking collar 236 of disk 89. Fig. 3 shows disk 89 as composed of a pair of duplicate members 237 assembled in face-to-face relation with their respective hub portions 235 outermost, and it will also be noted that each of these members 237 is provided with a series of peripheral notches 240 which are adapted for engagement with the notches 87 in blade edges 82 to assure proper relative spacing of the blades in the finished wheel. There are accordingly the same number of notches 240 in each member 237 as there are slots 231 in disks 230, this number being equal to the number of blades to be assembled in the finished wheel. In order to index the disk 89 with respect to the disks 230 so that the slots 231 and notches 240 will all be in proper alignment, a pin 241 is mounted in the disk 230 which is secured to body member 226, and this pin engages in a receiving hole 242 in each of members 237 as shown in Fig. 3. The holes 242 are so located with respect to the notches 230 in members 237 that when pin 241 is engaged therein, the notches 240 will be properly aligned with the slots 231 in disks 230 to receive the edges 82 of blades 80 set in the slots 231. It is accordingly unnecessary to secure the disk hubs 235 to spindle 181, since the pin 241 keys disk 89 to the fixture and maintains these parts in proper alignment throughout the blade assembling operation.

The dimensions of the fixture, and particularly of disks 240 and the slots 231 therein, are preferably such that when blades are fully inserted in all of slots 231, they will occupy the same relative positions as in the finished wheel. Accordingly, the fixture is provided with resilient means for holding blades firmly but yieldingly within these slots. As shown in Fig. 3, an annular member 245 is mounted intermediate slotted disks 230 for rotation on the hub portion 229 of body member 226. The member 245 carries on either side thereof one of a pair of annular disks 246, which are shown as secured to member 245 by means of bolts 247, and annular spacers 248 are provided between each disk 246 and the adjacent portions of members 225, 226 and 245. The disks 246 are formed with radial slots 249 arranged about their peripheries, these slots being the same in number and angular spacing as the slots 231 in disks 230 and the notches 240 in the central disk 89. Each of the slots 249 is adapted to receive and hold a spring member 250, which includes a loop 251 at its inner end which engages in the complementarily shaped inner portion of slot 249 and is thereby held against radial movement, these springs being held against axial movement of the fixture by the portions of member 245 which overlap the body member 225 and 226 as shown in Fig. 3. The springs 250 extend radially outwardly from the disks 246 into overlapping relation with the slots 231 in disks 230, and the outer end of each spring 250 is formed in a blade engaging loop 252 as shown in Figs. 4 and 5.

Means are provided for causing controlled rotation of member 245 with respect to the body members 225 and 226 and for thus causing movement of springs 250 relative to slots 231 to vary the pressure of the loop portions 252 of these springs on blades positioned in the slots 231. Referring first to Fig. 3, a hub member or hand wheel 255 is mounted on spindle 181 by means of a shouldered clamp nut 256, this portion 257 of the spindle being threaded and the clamp nut 256 being provided with socket holes 258 for receiving a suitable spanner wrench for adjusting purposes. The hand wheel 255 has a gear 260 secured thereto, as by means of a flange 261 bolted to the hand wheel as shown in Fig. 3. This gear 260 meshes with a plurality of gears 262 which include collar portions 263 journaled in angularly spaced holes in the body member 255, there being three of these gears 262 as shown in Fig. 4. Each gear 262 is pinned or otherwise secured to a stud 264 which includes an eccentric cam portion 265 integrally formed thereon or otherwise secured thereto. This construction thus provides for causing rotation of the stud 264 and cams 265 in response to rotation of hand wheel 255, and the outer surface of the hand wheel is preferably knurled or otherwise treated to facilitate manipulation thereof.

The studs 264 are so proportioned and arranged that their cam portions 265 lie within the open center of the intermediate member 245. This part of member 245 is formed as shown in Fig. 4 with three radially extending recessed portions, each of which includes a right angled wall portion 270 and a semi-cylindrically curved wall portion 271. The center axis of each stud 264 lies near and approximately equidistant from the wall portions 270 of one of these recesses in member 245, and each cam 265 has mounted thereon an eccentric strap 272 which includes an arm portion having a rounded end 273 adapted to engage the opposite cylindrical wall portion 271. Member 245 is also provided with elongated slots 275 positioned between the recesses 270—271 to receive bolts 227, spacers 276 being provided on these bolts 227 as shown.

The operation of these parts for varying the pressure of springs 250 on blades positioned within slots 231 is illustrated in Figs. 4 and 5. Fig. 4 shows the relative positions of the parts in the release position, which is the position of minimum pressure by the springs. It will also be noted that Fig. 4 shows one limit position of rotational movement of cams 265, since the eccentric straps 272 are in abutting contact with right angled walls 270 and thus are prevented from further rotation in counterclockwise direction as viewed in Fig. 4. With the cams in this position, it will be seen that intermediate member 245 is similarly at its limit of clockwise rotation relative to members 225 and 226 as viewed in Fig. 4, and that springs 250 accordingly have their outer loop portions 252 spaced angularly from adjacent walls 232 of slots 231. In this position, therefore, springs 250 exert minimum force on blades within slots 231, providing for ready relative disengagement between such blades and the fixture.

Fig. 5 illustrates the fixture parts in the other limit position of rotational movement of cams 265, i. e., their limit of clockwise rotation as viewed in Fig. 5 from the position shown in Fig. 4. It will be seen that during such rotational movement of the cams, the rounded ends 273 of eccentric straps 272 rock in the cylindrical wall portions 271 and exert thrust on these wall portions, thus causing the intermediate member 245 to rotate in counterclockwise direction as viewed in Figs. 4 and 5 and to carry springs 250 to the positions shown in Fig. 5, wherein each loop portion 252 closely approaches or passes the adjacent slot wall 232. It will also be understood that this rotation of the cams is obtained by rotating hub 255 on spindle 181, which movement is transmitted through gear 260 to the gears 262 on the studs 264 which carry cams 265.

When the parts are in the positions shown in Fig. 5, the loop portions 252 of springs 250 will exert yieldable resistance to the entry of the blade edges 82 into slots 231, but after this resistance has been overcome and the blades inserted in the slots, the springs will similarly exert substantial resistance to their withdrawal from the slots. As shown in Fig. 5, the springs opposite slots into which blades 80 have been inserted are deformed such that they bear against the blades and thus exert tension circumferentially of the fixture forcing the blade faces 81 against the slot walls 232 and holding the blades in the slots.

Fig. 5 accordingly shows the fixture in proper adjustment for picking up and assembling blades. Referring to Fig. 1, when the fixture spindle 181 is mounted on the arms 180 and caused to rotate, in clockwise direction as viewed in Fig. 1, at a peripheral speed substantially equal to the rate of travel of belts 100, the successive slots 231 in the fixture will come into register with successive blades 80 on the track, and these blades can thus be readily forced into the slots against the resistance of springs 250 and held therein. The blades will thus be successively picked up until the fixture is filled with the proper number of blades, which will occupy in the fixture the same relative positions as in the finished wheel and will have the flange portions 85 thereon forming semi-continuous flanges projecting radially outwardly as shown in Figs. 3 and 5. Also the blades will be properly indexed with the notches 240 in center disk 89, as a result of the indexing action of pin 241 and holes 242 as described. In order then to complete assembly of the wheel, end rings are applied to these blade flanges by means of the spinning device 15 shown in Fig. 1.

Referring to Fig. 1, the spinning device includes a frame 280 on which two hydraulically operated rams 281 are mounted for reciprocating movement towards and away from each other on substantially the same axis. Each of these rams carries a wheel 282 mounted for rotational movement on a shaft 283, and a motor 285 for rotating these shafts is indicated within the frame 280, the drive being transmitted from the motor through belts or sprockets within the housings 286 and uprights 287. A third ram is mounted on frame 280 for reciprocating movement radially of the axis of shafts 283, and it carries a spinning head 290, each end of which is provided with a spinning element such as a roller bearing 291.

In the use of this apparatus, an end ring of the proper diameter is mounted on each of the wheels 282 for example by means of small permanent magnets mounted at angularly spaced intervals about the inner surfaces of the wheels 282. End rings suitable for this purpose are shown and described in detail in the above noted application Serial No. 635,454, and one such ring is illustrated diagrammatically at 300 in Fig. 3. As shown it includes an offset shoulder portion 301 and an outer flange portion 302 adapted to overlap and overhang the flanges 85 of the blades assembled in a fixture.

When the proper number of blades have been assembled in the fixture as described, the filled fixture is transferred to the spinning unit, and the hydraulic rams 281 are actuated to clamp the fixture with the end rings overhanging the blade flanges 85 as described and shown in Fig. 3. Motor 285 is then operated to rotate shafts 283, and hence the wheels 281 and fixture clamped therebetween, and the third hydraulic ram is caused to move the spinning head 290 radially against the wheel. During this operation, the spinning members 291 cause the flanges 302 of the end rings to fold inwardly into overlapping and locking relation with the flanges 85. The spinning operation also tends to increase the spring tension of the blades within the fixture, thus offering substantial resistance to release of the cams 265 and their associated parts. Therefore, the fixture may be released by means of a spanner wrench applied to the holes 258 in the clamp nut 256, after which the fixture can be withdrawn axially from the blades to leave a finished wheel ready for balancing and any other desired tests.

It will accordingly be seen that the present invention provides an apparatus and a method by means of which the individual blower blades for a centrifugal blower wheel are successively formed, conveyed to an assembling station, assembled and held in proper circumferential alignment about a central axis and then provided with end rings for holding the assembled blades permanently in position to complete the blower wheel. In a typical work operation, the supply means 10 and the press are set in operation to form and deliver successive blades to the conveyor track, and an empty fixture 13 and a pair of center disks 89 are assembled on a spindle 181 and mounted on the bracket arms 180 at the assembling station of the track, with springs 250 of the fixture locked in their gripping positions shown in Fig. 5.

As described in the above noted application Serial No. 761,476, interrelated stops 175 and 185 on each side of the track are provided along the tracks for segregating the proper number of blades for the desired wheel and for stacking these blades in substantially the same relative spacing as when they are assembled in the finished wheel, with the stops 175 so located as to the first blade 80 aligned substantially directly below the axis of the spindle 181. Also, a safety switch 200 is provided which checks operation of the press 11 if the blades stack along the track between the stops 185 and switch 200 to prevent jamming the track or press.

Accordingly, at the start of the assembling operation, the operator first adjusts the fixture so that a pair of slots 231 in the disks 230 receive the uppermost edge 82 of this first blade 80. As soon as the fixture is thus properly engaged with the first of the stacked blades, the operator releases the stops 175 as described in the above parent application, and the stacked blades on the track will begin to move forward. Simultaneously the operator rotates the fixture on its spindle so that the peripheries of disks 230 travel at substantially the same rate as the blades on the track, which results in bringing successive slots 231 into register with the successive blades on the track, and the operator maintains sufficient downward pressure on the fixture to assure that the tension of springs 250 will be overcome to provide for entry of each blade into the slots. Accordingly, the blades will be successively picked up from the track as indicated in Fig. 1 until all the slots in the fixture are filled, this operation consuming only approximately as much time as required for the last blade picked up to travel from stop 185 to the assembly station. In the meantime, since additional blades will be formed and delivered to the track during the assembling operation at the assembly station, enough blades may accumulate to reach back on the track to the safety switch 200, and if this happens, further operation of the forming mechanism at the press will be suspended as already described.

After the fixture has been entirely filled with blades, it is then transferred to the spinning device 15 for application of the end rings as already described. In the meantime, an empty fixture may be mounted on the arms 180 to be filled with blades as described. The operation of the entire apparatus is thus substantially continuous, with one fixture being filled with blades at the assembling station of the track while the fixture filled in the previous assembling cycle has end rings applied to the blades as described in connection with the spinning device, and this apparatus and method also provide for such continuous operation with minimum handling and necessity for manual control other than the simple rotation of the fixture during the actual pickup operation and the manual transfer of the filled fixture to and from the spinning unit.

While the forms of apparatus herein described constitute preferred embodiments of the invention, it is to be understood that the invention is not limited to these precise forms of apparatus and that changes may be made therein without departing from the scope of the invention which is defined in the appended claims.

What is claimed is:

1. A fixture of the character described for assembling and holding a plurality of blower blades in circumferential alignment about a central axis, comprising a pair of holding members arranged in spaced coaxial relation about said axis and each having a plurality of angularly spaced slots in the periphery thereof to receive the inner edges of said blower blades at axially spaced positions on each said blade, a member positioned axially intermediate said slotted members and coaxial therewith, resilient means extending radially outward from said intermediate member into overlapping relation with said slots in said slotted members for engagement with portions of blades positioned in said slots at locations axially intermediate said portions of said blades received within said slots, and means for causing controlled rotation of said intermediate member relative to said slotted members about said central axis to cause said resilient means to exert circumferential tension against said blades positioned in said slots to hold said blades yieldably in said slots.

2. A fixture of the character described for assembling and holding a plurality of blower blades in circumferential alignment about a central axis, comprising a pair of circular members arranged in spaced coaxial relation about said axis and each having a plurality of angularly spaced slots in the periphery thereof to receive the inner edges of blower blades, one of said slotted members being formed for telescoping engagement with a hub for a blower wheel to provide for positioning said fixture closely adjacent the center axially of the blower blades assembled therein, a member positioned intermediate said slotted members and coaxial therewith, a plurality of spring fingers mounted in said intermediate member and extending radially outward therefrom into overlapping relation with said slots in said slotted members, and means for causing controlled rotation of said intermediate member relative to said slotted members about said central axis to arrange said fingers in such position relative to said slots as to exert yieldable resistance to the entry of blades into said slots by radial movement relative to said slotted members and also to exert yieldable resistance to the removal of blades from said slots.

3. A fixture of the character described for assembling and holding a plurality of blower blades in circumferential alignment about a central axis, comprising a spindle, a pair of circular members arranged in axially spaced relation upon said spindle and each having a plurality of angularly spaced slots in the periphery thereof to receive the inner edges of blower blades, a member positioned intermediate said slotted members for rotation relative thereto, a plurality of spring fingers mounted in said intermediate member and extending radially outward therefrom into overlapping relation with said slots in said slotted members, a hub rotatably mounted on said spindle, and means responsive to relative rotation of said hub and spindle to cause controlled rotation of said intermediate member relative to said slotted members effective to arrange said spring fingers in such position relative to said slots as to exert yieldable resistance to the entry of blades into said slots by substantially radial movement relative to said slotted members and also to exert yieldable resistance in the removal of blades from said slots.

4. A fixture of the character described for assembling and holding a plurality of blower blades in circumferential alignment about a central axis, comprising a pair of circular members arranged in spaced coaxial relation about said axis and each having a plurality of angularly spaced slots in the periphery thereof to receive the inner edges of blower blades, means carried by one of said circular members for indexing said slots with similarly angularly spaced notches in the periphery of a center disk for a blower wheel, a member positioned intermediate said slotted members and coaxial therewith, resilient means extending radially outward from said intermediate member into overlapping relation with said slots in said slotted members, and means for causing controlled rotation of said intermediate member relative to said slotted members about said central axis to cause said resilient means to exert circumferential tension against blades positioned in said slots to hold blades yieldably in said slots.

5. In the assembling and holding of a plurality of blower blades in circumferential alignment about a central axis to form a blower wheel including a center disk having a plurality of angularly spaced notches in the periphery thereof, the combination of a spindle centered with respect to said axis and adapted to receive said disk thereon, a pair of circular members arranged in spaced relation upon said spindle and adjacent said disk, each of said circular members having a plurality of angularly spaced slots in the periphery thereof to receive the inner edges of blower blades, there being the same number of said slots in each of said circular members as the number of said notches in said disk, means for indexing said disk with said circular members to align each of said notches with one of said slots in each of said circular members, a member positioned intermediate said circular members and coaxial therewith, resilient means extending radially outward from said intermediate member into overlapping relation with said slots in said circular members, and means for causing controlled rotation of said intermediate member relative to said circular members about said central axis to cause said resilient means to exert circumferential tension against blades positioned in said slots to hold blades yieldably in said slots.

6. A fixture of the character described for assembling and holding a plurality of blower blades in circumferential alignment about a central axis, comprising a pair of circular members arranged in spaced coaxial relation about said axis and each having a plurality of angularly spaced slots in the periphery thereof to receive the inner edges of blower blades, a member positioned intermediate said slotted members and coaxial therewith, resilient means extending radially outward from said intermediate member into overlapping relation with said slots in said slotted members, a shaft eccentrically mounted in one of said slotted members and extending into said intermediate member, a cam mounted on said shaft, a cam lever mounted on said cam, said intermediate member having a cut-out portion therein for cooperation with said cam lever, and means for causing rotation of said shaft and resultant relative movement between said cam lever and said cut-out portion in said intermediate member effective to cause relative rotation of said intermediate member and said slotted members and to arrange said resilient means in position to exert circumferential tension about blades positioned in said slots to hold such blades yieldably in said slots.

CARL E. WILKEN.
LYLE L. McGLADREY.

References Cited in the file of this patent

UNITED STATES PATENTS

| Number | Name | Date |
|---|---|---|
| 666,905 | Packer | Jan. 29, 1901 |
| 766,403 | Vincke | Aug. 2, 1904 |
| 1,325,325 | Janke | Dec. 16, 1919 |
| 1,815,821 | Baker | July 21, 1931 |
| 2,153,893 | Johanson | Apr. 11, 1939 |
| 2,155,264 | Freed | Apr. 18, 1939 |
| 2,436,561 | Flygare et al. | Feb. 24, 1948 |